United States Patent
Peng et al.

(10) Patent No.: US 11,361,192 B2
(45) Date of Patent: Jun. 14, 2022

(54) IMAGE CLASSIFICATION METHOD, COMPUTER DEVICE, AND COMPUTER-READABLE STORAGE MEDIUM

(71) Applicant: TENCENT TECHNOLOGY (SHENZHEN) COMPANY LIMITED, Shenzhen (CN)

(72) Inventors: Pai Peng, Shenzhen (CN); Xiaowei Guo, Shenzhen (CN); Kailin Wu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 95 days.

(21) Appl. No.: 16/853,733

(22) Filed: Apr. 20, 2020

(65) Prior Publication Data

US 2020/0250491 A1 Aug. 6, 2020

Related U.S. Application Data

(63) Continuation of application No. PCT/CN2018/111491, filed on Oct. 23, 2018.

(30) Foreign Application Priority Data

Nov. 1, 2017 (CN) .......................... 201711060265.0

(51) Int. Cl.
*G06K 9/62* (2022.01)
*G06V 10/44* (2022.01)
(Continued)

(52) U.S. Cl.
CPC .......... *G06K 9/6263* (2013.01); *G06K 9/6257* (2013.01); *G06N 3/04* (2013.01); *G06N 3/08* (2013.01); *G06V 10/22* (2022.01)

(58) Field of Classification Search
CPC .. G06K 9/6263; G06K 9/2054; G06K 9/6257; G06K 9/4628; G06K 9/6271;
(Continued)

(56) References Cited

U.S. PATENT DOCUMENTS

| | | | | |
|---|---|---|---|---|
| 10,325,181 | B2 * | 6/2019 | Xu ........................ | G06K 9/6267 |
| 2010/0086213 | A1 * | 4/2010 | Momoi ................ | G06V 40/103 |
| | | | | 382/195 |
| 2016/0358043 | A1 * | 12/2016 | Mu ....................... | G06K 9/6217 |

FOREIGN PATENT DOCUMENTS

| | | |
|---|---|---|
| CN | 103984959 A | 8/2014 |
| CN | 105513077 A | 4/2016 |

(Continued)

OTHER PUBLICATIONS

The World Intellectual Property Organization (WIPO) International Search Report for PCT/CN2018/111491 Jan. 25, 2019 5 Pages (including translation).

(Continued)

*Primary Examiner* — John W Lee
(74) *Attorney, Agent, or Firm* — Anova Law Group, PLLC

(57) ABSTRACT

Embodiments of the present disclosure provide an image classification method for a computer device. The method includes obtaining an original image and a category of an object included in the original image; adjusting a display parameter of the original image to satisfy a value condition to obtain an adjusted original image; and transforming the display parameter of the original image according to a distribution condition that distribution of the display parameter needs to satisfy, to obtain a transformed image. The method also includes training a neural network model based on the category of the object and a training set constructed by the adjusted original image and the transformed image;

(Continued)

and determining a category of an object included in a to-be-predicted image based on the trained neural network model.

15 Claims, 8 Drawing Sheets

(51) Int. Cl.
*G06V 10/82* (2022.01)
*G06V 40/18* (2022.01)
*G06N 3/04* (2006.01)
*G06N 3/08* (2006.01)
*G06V 10/22* (2022.01)

(58) Field of Classification Search
CPC ............ G06K 9/0061; G06K 9/00617; G06K 9/6268; G06N 3/04; G06N 3/08; G06N 3/0454; G06N 3/084
See application file for complete search history.

(56) References Cited

FOREIGN PATENT DOCUMENTS

| | | | | |
|---|---|---|---|---|
| CN | 105631482 A | 6/2016 | | |
| CN | 106295646 A | 1/2017 | | |
| CN | 106530295 A | 3/2017 | | |
| CN | 106934798 A | 7/2017 | | |
| CN | 107679525 A | 2/2018 | | |
| EP | 3218076 B1 | * | 7/2020 | ............ A63F 13/213 |
| WO | WO-2016075081 A | * | 5/2016 | ......... G06K 9/00201 |

OTHER PUBLICATIONS

The European Patent Office (EPO) The Extended European Search Report for 18872453.8 Nov. 24, 2020 10 Pages.

* cited by examiner

IMAGE CLASSIFICATION METHOD, COMPUTER DEVICE, AND COMPUTER-READABLE STORAGE MEDIUM

RELATED APPLICATIONS

This application is a continuation application of PCT Patent Application No. PCT/CN2018/111491, filed on Oct. 23, 2018, which claims priority to Chinese patent application No. 201711060265.0, filed with the National Intellectual Property Administration, PRC on Nov. 1, 2017 and entitled "IMAGE CLASSIFICATION METHOD, DEVICE AND COMPUTER-READABLE STORAGE MEDIUM", which is incorporated herein by reference in its entirety.

FIELD OF THE TECHNOLOGY

This application relates to image processing technologies and, in particular, to an image classification method, a computer device, and a computer-readable storage medium.

BACKGROUND

With the widespread applications of multimedia technologies and computer device networks, a large amount of image data is put on the network. How to effectively manage these image files and automatically identify and categorize the content of these images becomes increasingly more important.

At present, with the continuous improvement and development of machine learning methods, deep learning algorithms have received increasingly more attention. Convolutional neural network is an important algorithm in deep learning, and currently has become a research focus in the field of image recognition. An image classification technology based on the convolutional neural network can automatically extract feature information from an image and perform image expression by using the extracted feature.

However, for images in different specific fields or different categories, when classification is performed based on the convolutional neural network, it is often necessary to respectively establish network models for the fields or categories. Layers and an overall architecture of each network model are determined through training. However, in order to acquire higher feature expression ability to obtain higher classification accuracy, especially for the field having higher requirements on classification accuracy, it is often necessary to respectively obtain more identical or similar original image data as training data for images in the same field or category, to increase the network depth and expand the network scale. Because an architecture of each layer of a network model is determined based on an architecture of a previous layer by using more training data, the method for training the network model is complex, and the network model obtained through training is not stable enough in terms of image classification accuracy.

The disclosed methods and systems are directed to solve one or more problems set forth above and other problems.

SUMMARY

Once aspect of the present disclosure provides an image classification method for a computer device. The method includes obtaining an original image and a category of an object included in the original image; adjusting a display parameter of the original image to satisfy a value condition to obtain an adjusted original image; and transforming the display parameter of the original image according to a distribution condition that distribution of the display parameter needs to satisfy, to obtain a transformed image. The method also includes training a neural network model based on the category of the object and a training set constructed by the adjusted original image and the transformed image; and determining a category of an object included in a to-be-predicted image based on the trained neural network model.

Another aspect of the preset disclosure provides a computer device. The computer device includes a memory storing computer-readable instructions, and a processor coupled to the memory. The processor executes the computer-readable instructions to perform: obtaining an original image and a category of an object contained in the original image; adjusting a display parameter of the original image to satisfy a value condition to obtain an adjusted original image; transforming the display parameter of the original image according to a distribution condition that distribution of the display parameter needs to satisfy, to obtain a transformed image; training a neural network model based on the category of the object in the original image and a training set constructed by the adjusted original image and the transformed image; and determining a category of an object comprised in a to-be-predicted image based on the trained neural network model.

Another aspect of the present disclosure provides a non-volatile computer-readable storage medium. The non-volatile computer-readable storage medium stores computer-readable instructions executable by at least one processor to perform: obtaining an original image and a category of an object contained in the original image; adjusting a display parameter of the original image to satisfy a value condition to obtain an adjusted original image; transforming the display parameter of the original image according to a distribution condition that distribution of the display parameter needs to satisfy, to obtain a transformed image; training a neural network model based on the category of the object in the original image and a training set constructed by the adjusted original image and the transformed image; and determining a category of an object comprised in a to-be-predicted image based on the trained neural network model.

Details of one or more embodiments of this application are provided in the following accompanying drawings and descriptions. Other features, objectives, and advantages of this application will become more obvious from the specification, the accompanying drawings, and the claims.

BRIEF DESCRIPTION OF THE DRAWINGS

To describe the technical solutions in the embodiments of the present disclosure more clearly, the following briefly describes the accompanying drawings for describing the embodiments. Apparently, the accompanying drawings in the following description show merely some embodiments of the present disclosure, and a person of ordinary skill in the art may still derive other drawings from these accompanying drawings without creative efforts.

DETAILED DESCRIPTION

The following describes the technical solutions in the embodiments of the present disclosure with reference to the accompanying drawings. Apparently, the described embodiments are some of the embodiments of the present disclosure rather than all of the embodiments. Other embodiments obtained by a person of ordinary skill in the art based on the disclosed embodiments of the present disclosure without creative efforts shall fall within the protection scope of the present disclosure.

The present disclosure is further described in detail below with reference to the accompanying drawings. It is to be understood that the specific embodiments described herein are merely used to explain the present disclosure, and are not intended to limit the present disclosure.

Unless otherwise defined, all technical and scientific terms may be used as usually understood by a person skilled in the technical field to which the present disclosure belongs. In this specification, the terms used in the specification of the present disclosure are merely intended to describe objectives of the specific embodiments, but are not intended to limit the present disclosure. The term "and/or" used in this specification includes any or all combinations of one or more related listed items.

Before the present disclosure is further described in detail, the terms used in the embodiments of the present disclosure are described. The following explanations apply to the terms used in the embodiments of the present disclosure.

(1) An object refers to the object used for classification in this specification, such as a person or thing.

(2) A sample image is an image that includes an image of an object, such as an image in various digital formats such as JPEG.

(3) Image sharpening (also referred to as image enhancement) means enhancing an imaging characteristic of the object in the sample image through various means to increase the degree of difference between an imaging region of the object in the sample image and other region.

(4) A loss function is also referred to as a cost function, which is an objective function of neural network optimization.

(5) A neural network (NN) is a complex network system formed by a large number of simple processing units (referred to as neurons) widely connected to each other, which reflects a large quantity of basic features of the human brain function and is a highly complex non-linear dynamic learning system.

Embodiments of the present disclosure provide an image classification method, a computer device implementing the image classification method, and a storage medium storing an executable program for implementing the image classification method. For the implementation of the image classification method, the embodiments of the present disclosure provide a solution implemented on a terminal side and/or a server side, and an exemplary implementation scenario of image classification is to be described.

Figure 1:
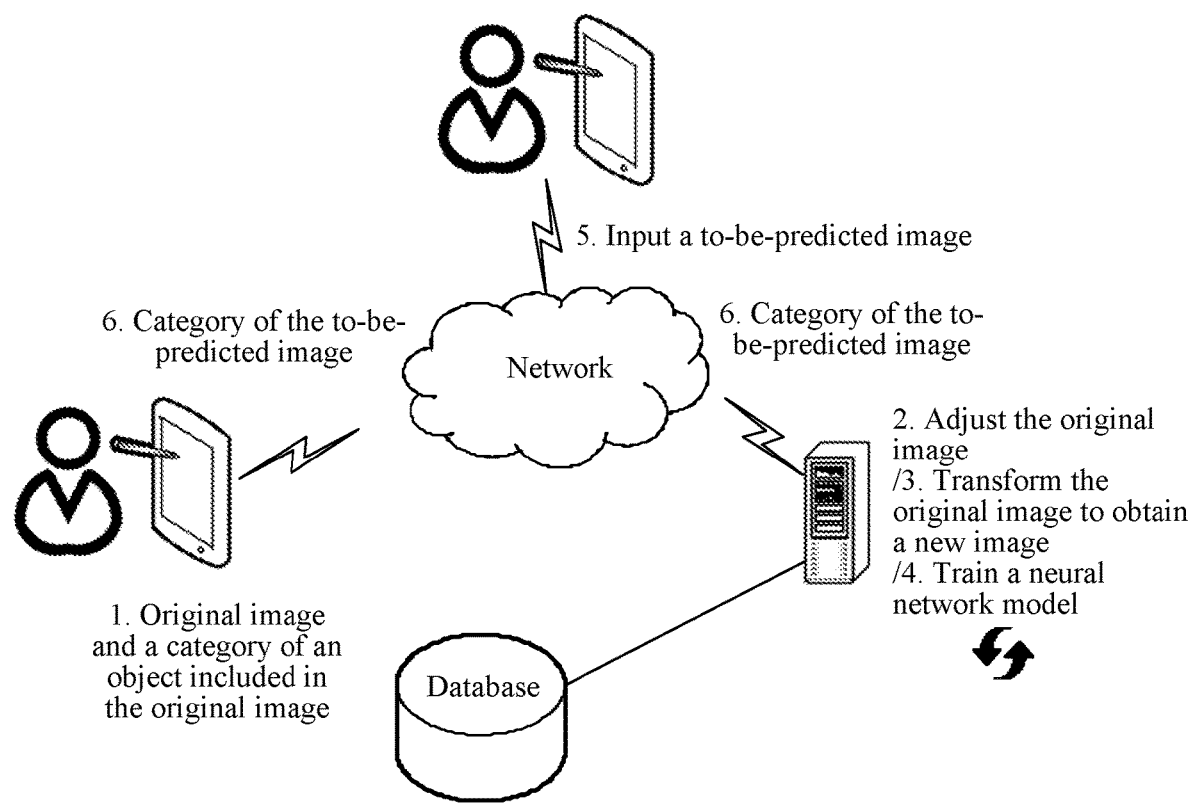
FIG. 1 is a schematic diagram of an application scenario of an image classification method according to an embodiment of the present disclosure.

FIG. 1 is a schematic diagram of an optional application scenario in which an image classification application of an image classification method determines a category of a to-be-predicted image on a server according to an embodiment of the present disclosure. As shown in FIG. 1, a user installs an image classification application client in a terminal, inputs a to-be-predicted image into the image classification application, and may obtain a classification result after the server extracts a feature of the to-be-predicted image and determines the category. The image classification application may be an image classification application in which a neural network model is determined through neural network training for objects included in different images so that the obtained objects included in different images are respectively recognized to determine a category. For example, the object included in an image is a human face. The image classification application is an image classification application in which a preset part (eyes or other parts) or a whole feature (all features constituting a face) of the human face included in the to-be-predicted image is recognized to determine a category. The category is a dimension for classifying a corresponding object. The classification dimension may be an external characteristic of the appearance of the object. Using the eye part as an example, the external characteristic may be phoenix eyes, triangular eyes, or the like. Alternatively, the classification dimension may be an inherent characteristic implied by the appearance of the object. Using the eye part as an example, the inherent characteristic may be personality, age, disease, or the like.

For example, an original image is an eye image, the object included in the original image is an eye, and the category of the object includes phoenix eyes, triangular eyes, willow eyes, fox eyes, and almond eyes. To establish and train a neural network model, original images may be stored in the database to be used for training the neural network model. The input to the neural network model may include images, and the output of the neural network model may include categories of the images. The original image(s) may also be adjusted and/or transformed to obtain new images for training the neural network model. After the neural network model is trained by the server, the server can be ready to classify images inputted by the user.

The user may install an image classification application client in the terminal, and inputs a to-be-predicted eye image into the image classification application. The image classification application may communicate with the server via the network. The server obtains the to-be-predicted eye image, extracts shape features of eyes in the to-be-predicted eye image, to determine, according to a similarity between the extracted shape features and a corresponding shape feature during category determining during training of the neural network model, whether a category of the eye in the to-be-predicted eye image is phoenix eyes, triangular eyes, willow eyes, fox eyes, or almond eyes, and sends the category to the terminal and the user via the network.

For example, an original image is used as a fundus image, the object included in the original image is an eyeball, and the category of the object includes normal, mild non-proliferative, moderate non-proliferative, severe non-proliferative, and proliferative. The user installs an image classification application in the terminal, and inputs a to-be-predicted fundus image through the image classification application. The server acquires the to-be-predicted fundus image, extracts structure features of eyeballs in the to-be-predicted fundus image, to determine, according to a similarity between the extracted structure features and a corresponding structure feature during category determining during training of the neural network model, that a category of the eye in the to-be-predicted fundus image is normal, mild non-proliferative, moderate non-proliferative, severe non-proliferative, or proliferative, and sends the category to the terminal.

In the descriptions of the foregoing application scenarios, the example where the original image is the image of the eye in the local part of the human body is used, but the present disclosure is not limited thereto. For images in other fields or categories, the image classification method of the embodiment of the present disclosure may also be used to implement training of the neural network model and prediction of the category of the object included in the predicted image.

Figure 2:
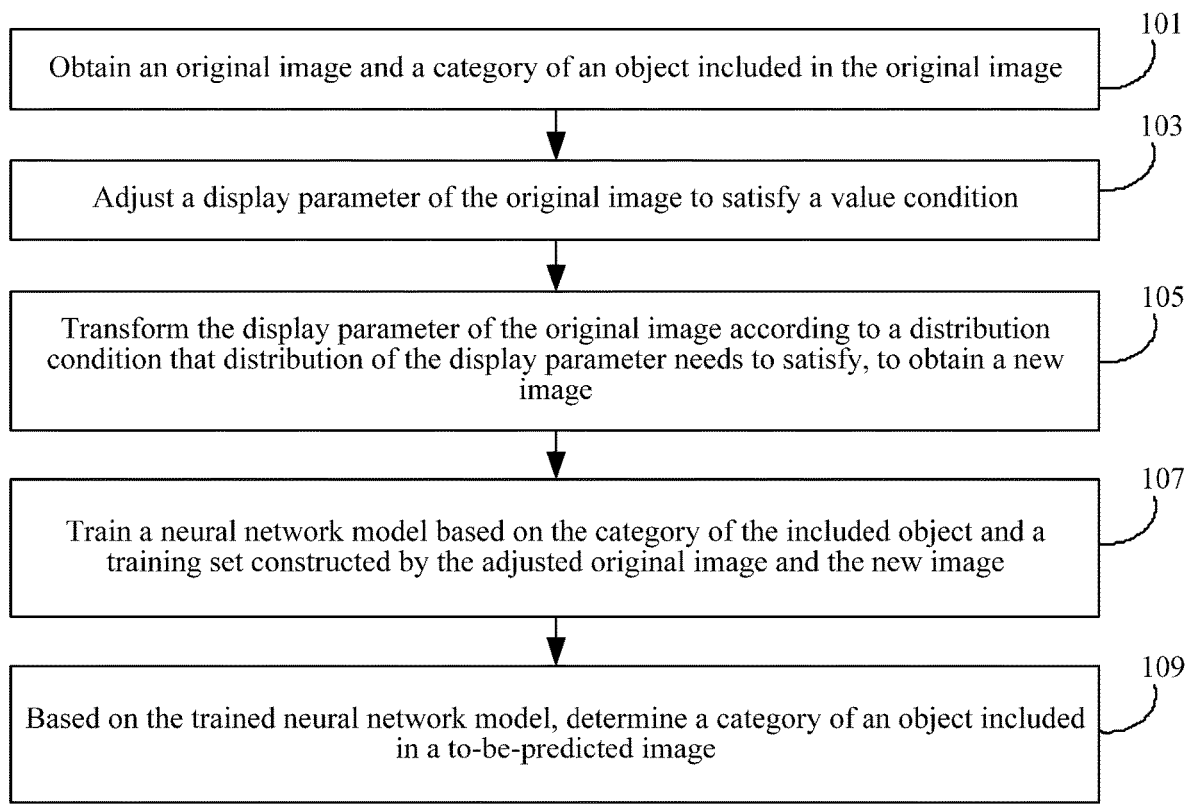
FIG. 2 is a flowchart of an image classification method according to an embodiment of the present disclosure.

FIG. 2 is an optional schematic flowchart of an image classification method according to an embodiment of the present disclosure. Steps of the method will be described respectively.

Step 101: Obtain an original image and a category of an object included in the original image.

The original image is a picture captured or drawn for a target object whose category needs to be determined. The object is a target object whose category needs to be determined. The category of the object refers to dimensions that need to be used for classifying the target object. The category of the object included in the original image may be predetermined according to a requirement for classification of the target object. In a specific implementation, the original image may be collected from an image library currently publicly available on the Internet, and the category of the object included in the original image is specified according to a predetermined category.

Step 103: Adjust a display parameter of the original image to satisfy a value condition.

The display parameter of an image refers to numerical information that is carried by the image and that may be used for adjusting a display effect of the image. The display parameter generally includes resolution, dimensions, and a color. In one embodiment, the display parameter of the image mainly includes a direction, dimensions, brightness, contrast, an aspect ratio, resolution, a color, and the like of the image. The value condition is a numerical range preset respectively for a corresponding display parameter. The display parameter of the original image is adjusted to meet the corresponding preset numerical range, to improve image quality for training the neural network model, accelerate a training speed, and improve the accuracy.

Step 105: Transform the display parameter of the original image according to a distribution condition that distribution of the display parameter needs to satisfy, to obtain a new image.

The display parameter refers to numerical information that is carried by the image and that may be used for adjusting a display effect of the image, mainly including a direction, dimensions, brightness, contrast, an aspect ratio, resolution, a color, and the like of the image. The distribution condition refers to a condition that needs to be satisfied and that is preset for different display parameters, such as average distribution, random distribution, and Gaussian distribution. The original image is transformed in real time according to a distribution condition that distribution of the display parameter needs to satisfy, to obtain more new images, implement data amplification, and increase training data used for training the neural network model.

Step 107: Train a neural network model based on the category of the included object and a training set constructed by the adjusted original image and the new image.

A training set is constructed based on the adjusted original image and the new image, which may be a multi-batch training set constructed using the adjusted original image as a sample image, or may be a multi-batch training set constructed using the new image as a sample image, and may further be a multi-batch training set constructed using the adjusted original image and the new image together as the sample image. The training set is constructed based on the adjusted original image and the new image, and a relatively small quantity of original images may be used to obtain more effective training sets, thereby obtaining higher training accuracy. Different batches of training sets are respectively inputted into the neural network model for training to form a plurality of iterations. For the same iteration, the adopted training set may be selected from a training set formed by original images or a training set formed by using new images, so that in one iteration, data in the adopted training set is processed in same or similar manner, respectively. In this way, a training error caused by image processing may be avoided, and training accuracy of the neural network model is improved. For different iterations, the adopted training set may be selected from either the training set formed by the original images or the training set formed by the new images.

The neural network model may be a neural network model obtained through pre-training based on a known image data set, and the neural network model may be a BP neural network model, a convolution neural network model, or a variation thereof.

Figure 3:
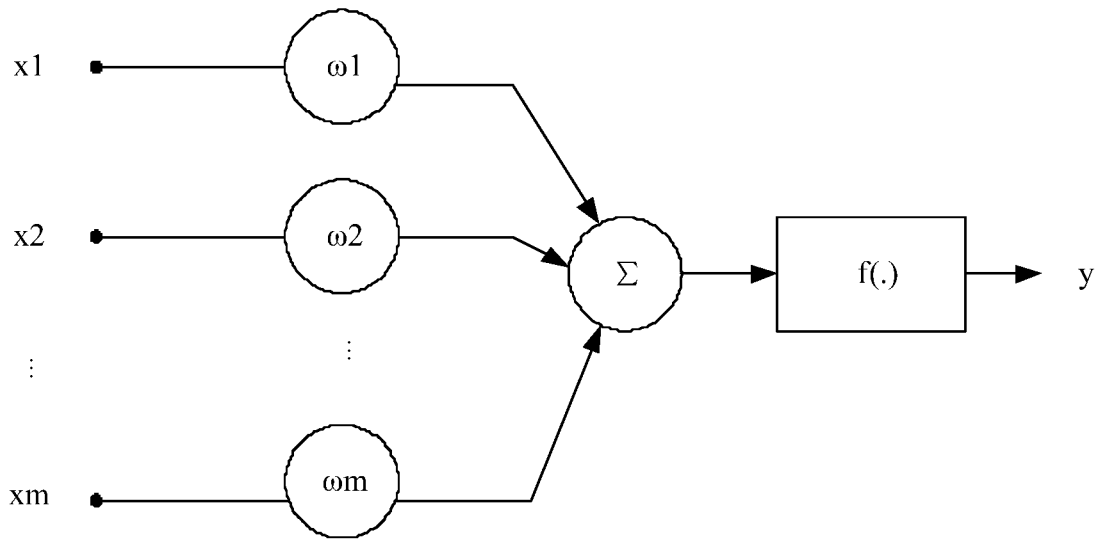
FIG. 3 is a schematic diagram of a neuron model of a BP neural network according to an embodiment of the present disclosure.
Figure 4:
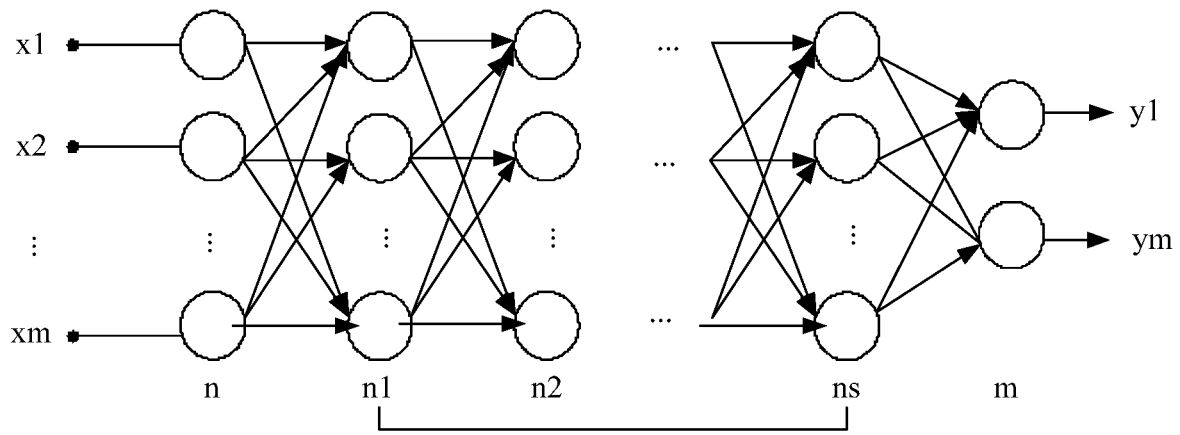
FIG. 4 is a schematic diagram of a BP neural network according to an embodiment of the present disclosure.

A basic unit of a BP neural network is neurons. FIG. 3 is a schematic diagram of a typical neuron model, $x_1, x_2, \ldots, x_m$ indicating inputs, $\omega_1, \omega_2, \ldots, \omega_m$ indicating synaptic weights, $\Sigma$ indicating a summation node, $f(\cdot)$ indicating an activation function, and y indicating an output. FIG. 4 is a schematic diagram of a neural network model formed by connecting a plurality of neurons according to a certain rule, n being an input layer, n1-ns being intermediate layers, and m being an output layer. It may be learned from FIG. 3 and FIG. 4, the BP neural network model mainly includes an input layer, a hidden layer (an intermediate layer), and an output layer. A number of neurons in the input layer is the same as a number of dimensions of input data, a number of neurons in the output layer is the same as an amount of data to be fitted, and a number of neurons and a number of layers in the hidden layer are set according to an actual training target.

A convolutional neural network is a deep learning architecture designed based on a biological natural visual cognitive mechanism, which mainly includes a convolutional layer, a pooling layer, and a fully connected layer. The convolution layer is the layer on which a convolution operation for an image is completed. The convolution operation means using a convolution kernel and a corresponding region of the image to perform convolution to obtain a value, and then continuously moving the convolution kernel and perform convolution to complete the convolution of the entire image. In the convolutional neural network, except the concept of convolution operation, calculation of convolutional layers usually includes concepts of depth and step size. A depth determines the number of neurons in the same region, that is, several convolution kernels perform convolution operations on the same region, and the step size is a number of pixels moved by the convolution kernel.

Figure 5:
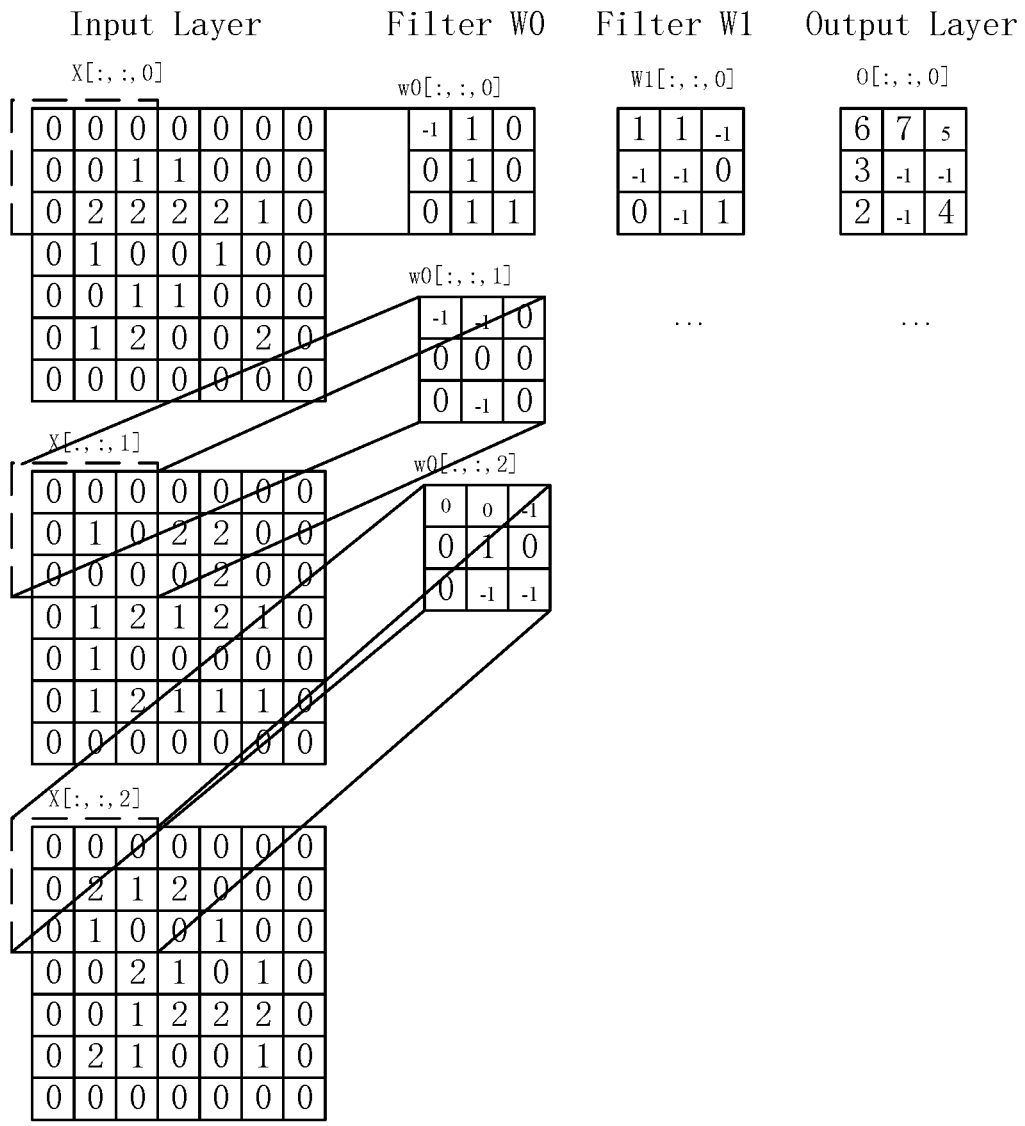
FIG. 5 is a schematic diagram illustrating an operation of a convolution layer of a convolutional neural network according to an embodiment of the present disclosure.

FIG. 5 is a schematic diagram of a convolution operation of a convolution layer by using an example that a height and a width of the input layer are both 7*7, the depth is 3, and a height and a width of each of two filters are both 3*3, the depth is 3, and the size of the convolution kernel is 3*3. The leftmost input layer and the first filter (Filter W0) are calculated, the first layer of the input layer and the first layer of Filter W0 are calculated, the second layer of the input layer and the second layer of Filter W0 are calculated, and the third layer of the input layer and third layer of Filter W0 are calculated. Finally, results of the three layers are accumulated to obtain the first result matrix of the output layer. In this way, the leftmost input layer and the second filter (Filter W1) are calculated to obtain the second result matrix of the output layer. The pooling layer is located between the convolution layers, and is used for compressing a preset block region of the input data of the previous layer into a value, thereby gradually reducing the data amount and a number of convolution parameters and reducing the phenomenon of overfitting.

Figure 6:
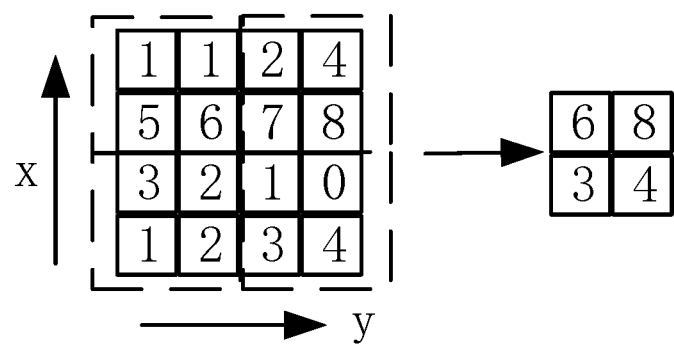
FIG. 6 is a schematic diagram of a pooling layer of a convolutional neural network according to an embodiment of the present disclosure.

FIG. 6 is a schematic diagram illustrating an operation of the pooling layer. As shown in FIG. 6, a maximum value in the 2*2 region is used for the pooling layer to represent the entire region. The fully connected layer is mainly used for learning, and maps distributed feature representations in the learned training set to sample label space to obtain a weight of the neural network model.

Training a neural network model mainly includes loading a training set and training a model parameter. Loading the training set is inputting a training set constructed based on the adjusted original image and the new image structure and a category of an included object into an initial neural network model for iterative training, calculating a cost through forward conduction, label information and a cost function, and updating parameters in each layer through backpropagation of a gradient of the cost function, to adjust the weight of the initial neural network model until the loss function of the neural network model meets a convergence condition to obtain a trained neural network model.

Step 109: Determine a category of an object included in a to-be-predicted image based on the trained neural network model.

The to-be-predicted image is inputted into the trained neural network model, a corresponding feature included in the reference image are captured through the neural network model, and a probability that the object included in the to-be-predicted image belongs to a corresponding category is determined through a degree of the similarity between the extracted feature and features of images that correspond to different categories and that are mapped to sample label space during model training, thereby determining a category of the object included in the to-be-predicted image.

According to the image classification method provided in the embodiments of the present disclosure, the display parameter of the original image is adjusted to satisfy the value condition by acquiring the original image and the category of the object included in the original image, to obtain an adjusted original image. The display parameter of the original image is transformed according to the distribution condition that distribution of the display parameter needs to satisfy, to obtain a new image. Therefore, more effective training sets for training neural network models are constructed based on the adjusted original image and the new image, and in a case that there are a small number of original images in the same field or category, stable classification accuracy can also be obtained. During training based on the category of the included object and the training set constructed by the adjusted original image and the new image, training may be performed based on a known neural network model, the trained neural network model is obtained after the weight is updated to predict the to-be-predicted image, and the training method is simpler.

In one embodiment, the training a neural network model includes: initializing the neural network model; and inputting an image included in the training set and a corresponding category into the neural network model for iterative training until a loss function of the neural network model satisfies a convergence condition, to obtain a single neural network model for classifying the to-be-predicted image.

Depending on different quantities of objects included in the to-be-predicted image, in the image classification method provided in the embodiment of the present disclosure, the methods of training the neural network model are different, and the neural network models used for classifying the to-be-predicted image are also correspondingly different. When there is one object included in the to-be-predicted image, the initializing the neural network model means initializing a parameter of the neural network model, to build an initial neural network model. The initializing a parameter of the neural network model mainly includes initializing a connection parameter, that is, a weight of an edge in a neural network, between layers in the neural network model.

In one embodiment, the initializing a parameter of the neural network model may further include: initializing a number of iterations in the neural network model, a batch processing size, a learning rate, a number of neural network layers, and the like. In the embodiment of the present disclosure, the initial neural network model may be a pre-trained neural network model based on a pre-trained image data set, for example, convolutional neural network models such as Inception V1, Inception V2, Inception V3, Inception V4 that are obtained through pre-training on known image data sets such as ImageNet, resNet, VGG, and DenseNet. Certainly, the initial neural network model used in the initialization neural network model is not limited thereto, or may be any neural network model pre-trained based on other pre-trained image data sets. The neural network model is initialized, and the initial neural network model is built using the parameter of the neural network model pre-trained based on the pre-trained image data set, so that a difficulty of training the neural network model is greatly simplified. The initial neural network model is trained according to the training set constructed based on the category of the included object and the adjusted original image and the new image, to update the weight, thereby ensuring stability of classification accuracy while effectively reducing the training difficulty.

According to the number of objects included in the to-be-predicted image, the image included in the training set and the corresponding category are inputted into the neural network model for iterative training, until the loss function of the neural network model satisfies the convergence condition, and the obtained neural network model used for classifying the to-be-predicted image is a single neural network model. In the implementation of obtaining a single neural network model, an initial neural network model is built by using the parameter of a neural network model pre-trained based on a pre-trained image data set. Specifically, according to a number n of categories of objects included in the to-be-predicted image, an original classification layer in the pre-trained neural network model is replaced with a softmax classification layer that implements the corresponding number n classification, to build the initial neural network model.

During training of the neural network model, after the combined neural network model is initialized, the method mainly further includes loading a training set and training a model parameter. Loading the training set is inputting a training set constructed by the adjusted original image and the new image structure and a category of an included object into an initial neural network model for iterative training, calculating a cost through forward conduction, label information and a cost function, and updating parameters in each layer through backpropagation of a gradient of the cost function, to adjust the weight of the initial neural network model until the loss function of the neural network model meets a convergence condition to obtain a final neural network model. The initial neural network model refers to a neural network model before training. The final neural network model refers to a neural network model after training.

In another embodiment, the image classification method further includes: obtaining a loss function of a neural network model by combining a K loss (kappa loss) function and a multi-categorization logarithmic loss function (categorical crossentropy) at a preset ratio.

The loss function, also referred to as a cost function, is an objective function of neural network optimization. A process of neural network training or optimization is a process of minimizing the loss function. A smaller loss function value leads to a corresponding prediction result closer to a value of a true result. In a specific embodiment, the K loss function and the multi-categorization logarithmic loss function are combined at a preset ratio, such as a 60% K loss function and a 40% multi-categorization logarithmic loss function, to form a mixed loss function. Therefore, the softmax classification layer may have higher accuracy for data formed by strong Gaussian noise and some abnormal points with large amplitude.

In an embodiment, Step 109 of determining a category of an object included in a to-be-predicted image based on the trained neural network model includes: in a single neural network model, extracting an image feature in the to-be-predicted image, and performing down-sampling processing on the extracted image feature; and mapping a feature of the down-sampling process to a probability that the object belongs to different categories.

For the single neural network model, there is one object included in the to-be-predicted image. The single neural network model obtained through training extracts the image feature of the object included in the to-be-predicted image, performs down-sampling processing on the extracted image features, inputs the feature after the down-sampling process, that is, a feature vector after dimensionality reduction, into the classification layer, and outputs, through the classification layer, the probability that the corresponding object belongs to different categories, thereby obtaining a result of classifying to-be-predicted images.

In another optional embodiment, the training a neural network model includes: initializing the neural network model; initializing, according to at least two objects included in the original image, a cascade layer, a fully connected layer, a classification layer corresponding to the object that are sequentially connected to the neural network model, to obtain a combined neural network model used for classifying the to-be-predicted image; and inputting an image included in the training set and a corresponding category into the combined neural network model for iterative training until the loss function satisfies the convergence condition.

When there are two or more objects included in the to-be-predicted image, the initializing the neural network model means initializing a parameter of the neural network model, to build an initial neural network model. According to the number of objects included in the to-be-predicted image (the original image), a cascade layer, a fully connected layer, and a classification layer corresponding to the object that are sequentially connected to the initial neural network model are initialized to build an initial combined neural network model. The initializing a parameter of the neural network model mainly includes initializing a connection parameter, that is, a weight of an edge in a neural network, between layers in the neural network model.

Optionally, the initializing a parameter of the neural network model may further include: initializing a number of iterations in the neural network model, a batch processing size, a learning rate, a number of neural network layers, and the like. In the embodiment of the present disclosure, the initial neural network model may be a pre-trained neural network model based on a pre-trained image data set, for example, convolutional neural network models such as Inception V1, Inception V2, Inception V3, Inception V4 that are obtained through pre-training based on pre-trained image data sets such as ImageNet, resNet, VGG, and DenseNet. Certainly, the initial neural network model used in the initialization neural network model is not limited thereto, or may be any neural network model pre-trained based on other pre-trained image data sets, and the initial neural network model is built by using the parameter of the neural network model pre-trained based on the pre-trained image data set.

The initial combined neural network model is built based on the initial neural network model. Each image included in the training set and a corresponding category are inputted into the initial combined neural network model for iterative training until a loss function of the combined neural network model satisfies a convergence condition, to obtain a final combined neural network model used for classifying the to-be-predicted image. In the implementation of obtaining the combined neural network model, the initializing, according to the number of objects included in the original images, a cascade layer, a fully connected layer, and a classification layer corresponding to the object that are sequentially connected to the initial neural network model to obtain an initial combined neural network model used for classifying the to-be-predicted image specifically includes: connecting the last convolutional layer of the initial neural network model to the cascade layer, the fully connected layer, and two or more classification layers corresponding to the object in sequence, to build an initial combined neural network model.

During training of the neural network model, after the combined neural network model is initialized, the method mainly further includes loading a training set and training a model parameter. Loading the training set is inputting a training set constructed by the adjusted original image and the new image structure and a category of an included object into an initial combined neural network model for iterative training, calculating costs through forward conduction, label information, and a cost function, and updating parameters in each layer through backpropagation of a gradient of the cost function, to adjust the weight of the initial combined neural network model until the loss function of the neural network model meets a convergence condition to obtain a final combined neural network model. The initial neural network model refers to a neural network model pre-trained based on a pre-trained image data set. The initial combined neural network model refers to the training set that is prior to training and that is constructed according to a number of objects included in the to-be-predicted image and the initial combined neural network model. The final combined neural network model refers to a neural network model after training. In this way, based on the neural network model pre-trained through a pre-trained image data set, the neural network model for classifying the to-be-predicted image is constructed, so that the neural network model may be constructed more simply, the training method is simplified, and stable classification accuracy can be quickly obtained.

When there are two or more objects included in the to-be-predicted image, the two or more objects refer to the same or symmetrical objects. For example, the to-be-predicted image is a fundus image. An object included in the fundus image may be the left eyeball or the right eyeball. Therefore, according to two objects included in the fundus image, a combined neural network model may be built and trained. In an embodiment, still for example, the to-be-predicted image is a fundus image. Objects included in the fundus image are eyeballs. Therefore, according to one object included in the fundus image, a single neural network model may be built and trained. Alternatively, the objects included in the to-be-predicted image are the left eyeball and the right eyeball, respectively, and a corresponding single neural network model is constructed and trained.

In an embodiment, Step 109 of determining a category of an object included in a to-be-predicted image based on the trained neural network model includes: in a combined neural network model, correspondingly extracting an image feature from a to-be-predicted image of at least two objects using the combined neural network model; cascading the extracted image feature and performing down-sampling processing; and respectively mapping an image feature of the down-sampling process to a probability that the at least two objects belong to different categories.

For the combined neural network model, there are two or more objects included in the to-be-predicted image. The combined neural network model obtained through training extracts the image feature of the object included in the to-be-predicted image, cascades image features of the two or more objects through the cascade layer, performs down-sampling processing on the extracted image features through the fully connected layer, inputs the feature after the down-sampling process, that is, a feature vector after dimensionality reduction, into a corresponding classification layer, and respectively outputs, through the classification layer, the probability that the corresponding object belongs to different categories, thereby obtaining a result of classifying to-be-predicted images.

In another implementation, Step 103 of adjusting a display parameter of the original image to satisfy a value condition includes: detecting an imaging region of an object included in the original image; and adjusting dimensions of the original image to be consistent with dimensions of the imaging region of the object included in the original image.

The dimensions are used as the display parameter of the original image, and the dimensions of the imaging region of the object are used as the value condition. The dimensions of the original image are adjusted to be consistent with the dimensions of the imaging region of the included object, so that dimensions of objects included in the original image are consistent. For example, the original image is the fundus picture and the object included in the original image is the eyeball. The imaging region of the object refers to an imaging region of the eyeball. Dimensions of an original fundus picture are adjusted, so that eyeballs in different original fundus pictures have the same dimensions such as 300 pixels. Through adjustment, the dimensions of the original image are consistent with the dimensions of the imaging region of the object, thereby unifying the dimensions of the objects included in the original picture, to avoid affecting the training accuracy due to small object dimensions during subsequent training of the neural network model, and avoid a training error as a result of different object dimensions.

In another implementation, Step 103 of adjusting a display parameter of the original image to satisfy a value condition includes: performing image enhancement processing on each color channel of the original image based on a recognition degree that the original image needs to satisfy.

Image enhancement means enhancing useful information in an image to improve a visual effect of the image. The color channel is a channel that saves color information of the image. Each image has one or more color channels. Each color channel is used for storing information about a color element in the image. The colors in all color channels are superimposed and mixed to generate a color of a pixel in the image. The recognition degree refers to a degree to which an image can be recognized. An image enhancement method may include the following methods. First, a contrast increasing method is transforming a grayscale value of the image using a linear function. Second, a Gamma correction method is transforming the grayscale value of the image using a non-linear function (an exponential function). Third, a histogram equalization method is converting a histogram of the original image into an image with probability density of 1 (if ideal) through an integrated probability density function, and increasing the contrast, to achieve widening of a specific region through histogram equalization, so that the entire image is transformed to a bright region. Fourth, a histogram standardization method is converting the histogram of the original image into a form of the specified histogram according to a result of histogram equalization, determining a histogram of a target image by referring to the histogram of the original image, and obtaining the histogram using a Gaussian function. Fifth, a homomorphic filter is provided. A grayscale image f (x, y) may be regarded as two parts of an incident light component i (x, y) and a reflected light component r (x, y): f (x, y)=i (x, y)*r (x, y). Incident light is relatively uniform, changes little as a spatial position changes, and occupies a low-frequency component segment. Reflected light reflects light with different strength due to different properties and structural characteristics of the object, occupies a higher-frequency component as the spatial position changes greatly, and is designed based on a principle that an image is formed by combining a light spectrum and a reflection spectrum. Sixth, a color image enhancement method based on HSV space is converting an RGB image into images in other spaces, for example, converting an image in an RGB space into an image in HSV space. HSV refers to hue, saturation, and brightness, respectively, and three variables of HSV are adjusted for enhancement.

Through the foregoing first to third methods, an image region of interest, that is, the imaging region of the object whose feature needs to be extracted, may be widened, and the region of no interest, that is, a background region without needing to extract a feature, may be compressed to achieve an effect of image enhancement. The foregoing first to fifth methods are suitable for performing image enhancement processing on a grayscale image, and the sixth method is suitable for performing image enhancement processing on a color image.

In one embodiment of the present disclosure, a color channel is used as the display parameter of the image, and a preset recognition degree that needs to be met is used as the value condition. Each color channel of the original image is enhanced by using an image enhancement method, thereby emphasizing overall or local features of the image to make an originally unclear image clear and emphasizing the feature that needs to be extracted to enlarge a difference between different features in the image. In the process of enhancing each color channel of the original image by using the image enhancement method, in the image enhancement method, one or more of the first to sixth image enhancement methods may be selected for combination as required.

For example, in a specific embodiment, the performing image enhancement processing on each color channel of the original image based on a recognition degree that the original image needs to satisfy includes: performing steps S1 to S3 for each color channel of each pixel in the original image. S1. Determine a pixel region range of a preset size with a pixel as a center, determine a corresponding color average value within the pixel region range, and obtain a difference value between a color value of each color channel of each pixel and the color average value. S2. Multiply the difference value by a preset value; S3. Add each pixel to a grayscale value of a preset ratio. A difference value between the color value of each color channel of each pixel and a color value within a preset pixel region range is acquired and multiplied by the preset value, so that a degree of difference between the pixels may be increased, and a training speed of the image for training a neural network model may be accelerated. A value range of the preset value may be [1-8], preferably 4, and a value of the grayscale value of the preset ratio may be 50%, specifically 128. Through steps S1 to S3, image enhancement processing is performed on each color channel of the original image, which may suppress the feature that does not need to be extracted, to improve image quality, enrich an amount of information, and improve an effect of determining and recognizing the original image.

In another embodiment, Step 103 of adjusting a display parameter of the original image to satisfy a value condition includes: cropping a non-imaging region of the object in the original image; and adjusting the cropped image to preset dimensions.

Cropping is an action of acquiring a required local part from the whole. Dimensions are used as the display parameter of the original image, that overall dimensions of the image conform to preset dimensions are used as a value condition, and a non-imaging region of the original image is cropped so that dimensions of the original image are consistent with the preset dimensions. For example, the original image is a fundus picture and an object included in the original image is an eyeball. An imaging region of the object refers to an imaging region of the eyeball, and a non-imaging region outside the eyeball included in an original fundus picture is cropped, to adjust overall dimensions of the cropped original fundus picture to be consistent with the preset dimensions, thereby unifying dimensions of the imaging region of the object included in the original image, reducing an area of a no-information region in the original image, and improving a training speed and accuracy of the original image for training the neural network model.

In one embodiment, the adjusting a display parameter of the original image to satisfy a value condition includes: first adjusting dimensions of the original image to be consistent with dimensions of an imaging region of an object, then performing image enhancement processing on each color channel of the original image, and cropping a non-imaging region of the object in the image. The dimensions of the imaging region of the object in the image are first adjusted before performing the image enhancement processing, so that a line feature may be more prominent when local features in the image are enhanced through image enhancement. The dimensions of the imaging region of the object in the image are first adjusted and cropped after image enhancement processing, so that an area of a no-information region in the image may be minimized, thereby improving efficiency of image processing.

In another embodiment, Step 105 of transforming the display parameter of the original image according to a distribution condition that distribution of the display parameter needs to satisfy, to obtain a new image includes: determining, according to a value space in which a display parameter of at least one category of the image is located and a distribution condition that the value space satisfies, a missing display parameter according to the display parameter of the original image compared with the distribution condition; and transforming the display parameter of the original image into the missing display parameter, to obtain a new image.

The display parameter of at least one category of the image may refer to at least one of a direction, dimensions, brightness, contrast, an aspect ratio, resolution, and a color of the image. Value space refers to a value range corresponding to different categories of the display parameter. The value space is set for different categories of the display parameter, an image transformation condition is set based on the value space and distribution conditions of different display parameters, thereby obtaining more new images that may be used for training a neural network model.

In certain embodiments, the category of the display parameter is the direction of the image, the corresponding value space is horizontal flipping or flipping at 90 degrees, and the distribution condition is even distribution. Step 105 of transforming the display parameter of the original image according to a distribution condition that distribution of the display parameter needs to satisfy, to obtain a new image specifically includes: according to the direction of the original image included in the round of training data, using average distribution as the distribution condition, and horizontally flipping the original image with a 50% probability or at 90 degrees, to obtain a new image to form a new round or more round of training data.

In certain embodiments, the category of the display parameter is the aspect ratio of the image, the corresponding value space is a range of a cropping ratio for a length or a width, and the distribution condition is random distribution. Step 105 of transforming the display parameter of the original image according to a distribution condition that distribution of the display parameter needs to satisfy, to obtain a new image includes: according to the range of the cropping ratio for the aspect ratio of the original image included in the round of training data, using the random distribution as the distribution condition, and randomly cropping the length or width of the original image at an arbitrary ratio within the range of the cropping ratio, to obtain a new image to form a new round or more round of training data. Specifically, the length and width of the original image may be randomly cropped from 0% to 15% based on an initial length and width, respectively.

In certain embodiments, the category of the display parameter is the brightness of the image, the corresponding value space is a brightness increase/decrease value range of the image, and the distribution condition is random distribution. Step 105 of transforming the display parameter of the original image according to a distribution condition that distribution of the display parameter needs to satisfy, to obtain a new image specifically includes: according to the brightness increase/decrease value range for brightness adjustment of the original image included in the round of training data, using the random distribution as the distribution condition, and randomly increasing brightness of the original image at a brightness value within the brightness increase/decrease value range, to obtain a new image to form a new round or more round of training data. Specifically, the brightness of the original image may be added to an arbitrary brightness value within the brightness increase/decrease value range, and the brightness increase/decrease value is in a range of negative 10 candela/square meter and 10 candela/square meter ($cd/m^2$).

In certain embodiments, the category of the display parameter is the brightness of the image, the corresponding value space is a brightness increase/decrease ratio range of the image, and the distribution condition is random distribution. Step 105 of transforming the display parameter of the original image according to a distribution condition that distribution of the display parameter needs to satisfy, to obtain a new image specifically includes: according to the brightness increase/decrease ratio range of the original image included in the round of training data, using the random distribution as the distribution condition, and randomly increasing the brightness of the original image at a ratio within the brightness increase/decrease ratio range, to obtain a new image to form a new round or more round of training data. Specifically, the brightness of the original image may be adjusted to 75% to 125% of the initial brightness.

In certain embodiments, the category of the display parameter is the contrast of the image, the corresponding value space is a contrast increase/decrease ratio range of the image, and the distribution condition is random distribution. Step 105 of transforming the display parameter of the image according to a distribution condition that distribution of the display parameter needs to satisfy, to obtain a new image includes: according to the contrast increase/decrease ratio range for brightness adjustment of the original image included in the round of training data, using the random distribution as the distribution condition, and randomly increasing the brightness of the original image at a brightness value within the contrast increase/decrease ratio range, to obtain a new image to form a new round or more round of training data. Specifically, the contrast of the original image may be adjusted to 75% to 125% of the initial brightness.

In certain embodiments, the category of the display parameter is the dimensions of the image, the corresponding value space may be a scaling ratio range of the image, and the distribution condition is random distribution. Step 105 of transforming the display parameter of the original image according to a distribution condition that distribution of the display parameter needs to satisfy, to obtain a new image specifically includes: according to the scaling ratio range of the original image included in the round of training data, using the random distribution as the distribution condition, and randomly enlarging the original image at a ratio within the scaling ratio range, to obtain a new image to form a new round or more round of training data. Specifically, the scaling ratio range of the original image may be adjusted to 90% to 110% of an original size.

In certain embodiments, the category of the display parameter is the direction of the image, the corresponding value space is a range of directions in which the image is rotated, and the distribution condition is random distribution. Step 105 of transforming the display parameter of the original image according to a distribution condition that distribution of the display parameter needs to satisfy, to obtain a new image specifically includes: according to the range of directions in which the original image is rotated and included in the round of training data, using the random distribution as the distribution condition, and randomly enlarging the original image at a ratio within the rotating direction range, to obtain a new image to obtain a new round or more round of training data. Specifically, the direction of the original image may be based on an initial direction and randomly rotated at any angle within a range of rotation directions, and the rotation direction is in a range of negative 180 degrees and 180 degrees.

In an embodiment, according to the distribution condition that the distribution of the display parameter needs to satisfy, during transforming the display parameter of the original image to obtain a new image, the category of the display parameter is not limited to the category given in the foregoing embodiments. In addition, when the original image is transformed to obtain a new image, one or a combination of a plurality of technical means for transforming the image in the foregoing embodiment may be adopted, and any of the following augmentation operations is randomly performed for each round of training data. 1. Horizontally flip the training image with a preset probability value; 2. Randomly crop a width and a height of the original image based on a first ratio range value; 3. Randomly perform addition/subtraction operation on brightness of the original image based on a second ratio range value; 4. Randomly perform multiplication/division operation on brightness of the original image based on a third ratio range value; 5. Randomly perform multiplication/division operation on contrast of the original image based on a fourth ratio range value; 6. Randomly scale a width and a height of the original image based on a fifth ratio range value; 7. Randomly rotate the original image based on a sixth ratio range value. A real-time data augmentation operation is performed on each round of training data, thereby obtaining more rounds of effective training data for training the neural network model.

Figure 7:
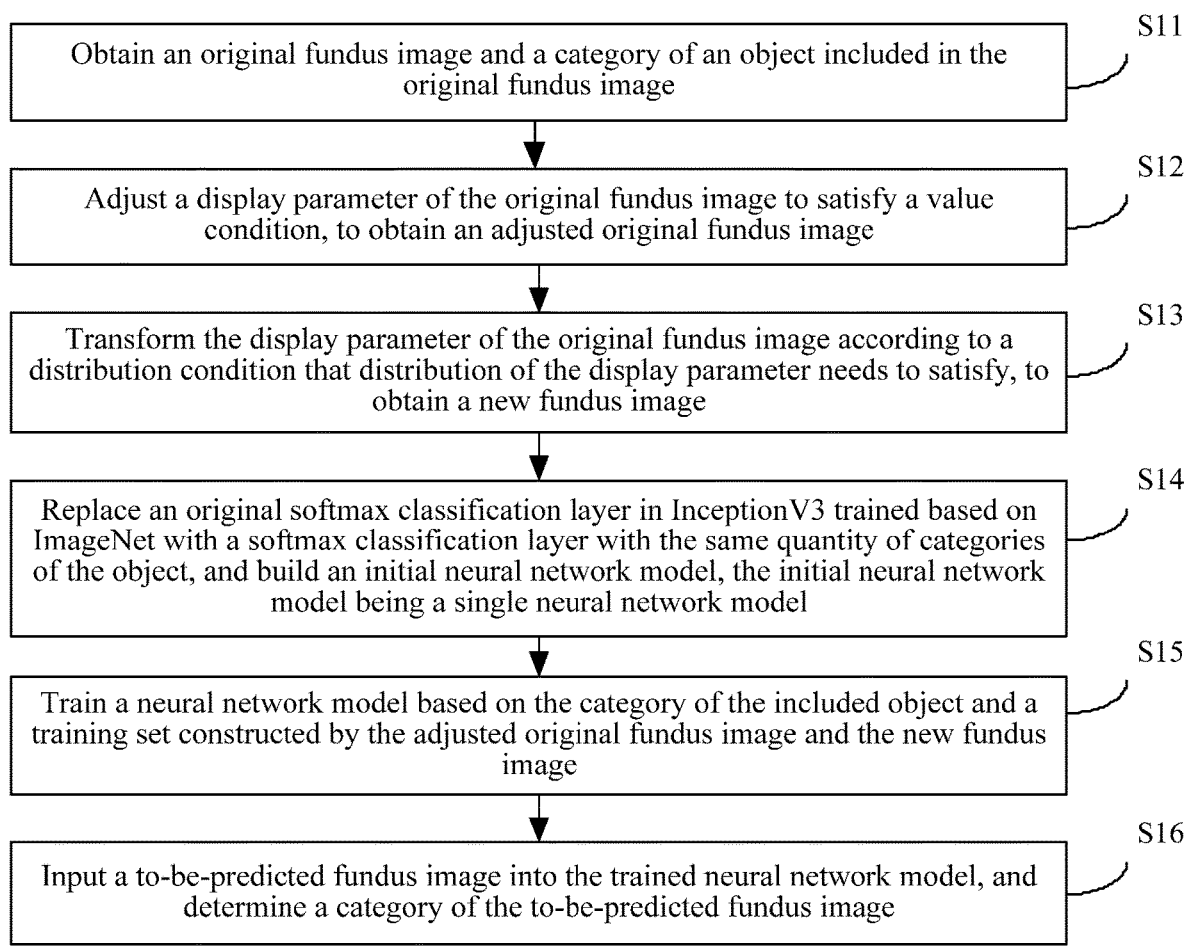
FIG. 7 is a flowchart of an image classification method according to a specific embodiment of the present disclosure.

Reference is made to FIG. 7, in which an original image is a fundus image and a single neural network model is trained based on InceptionV3 trained on ImageNet. The image classification method provided in the embodiment of the present disclosure is described as follows.

S11. Obtain an original fundus image and a category of an object included in the original fundus image. As an optional solution, the category of the object includes five categories that may assist in recognizing features of retinopathy of an eyeball, respectively normal, mild non-proliferative, moderate non-proliferative, severe non-proliferative, or proliferative.

S12. Adjust a display parameter of the original fundus image to satisfy a value condition, to obtain an adjusted original fundus image. As an optional solution, the adjusting a display parameter of the original fundus image to satisfy a value condition includes: scaling the original fundus image so that an eyeball in the original fundus image has the same radius, such as 300 pixels; subtracting a preset pixel value within a preset pixel region range from each channel of each pixel in the original fundus image, multiplying each pixel value by a preset fixed value, and then adding each pixel value to a grayscale value at a preset ratio; cropping a non-imaging no-information region of the original fundus image; and scaling the original fundus image to a preset size, such as 299 pixels wide and 299 pixels high.

S13. Transform the display parameter of the original fundus image according to a distribution condition that distribution of the display parameter needs to satisfy, to obtain a new fundus image. As an optional solution, the method of transforming the display parameter of the original fundus image according to a distribution condition that distribution of the display parameter needs to satisfy includes at least one of the following: horizontally flipping the original fundus image or the new fundus image with a preset probability value; randomly cropping a width and a height of the original fundus image based on a first ratio range value; randomly performing addition/subtraction operation on brightness of the original fundus image based on a second ratio range value; randomly performing multiplication/division operation on brightness of the original fundus image based on a third ratio range value; randomly performing multiplication/division operation on contrast of the original fundus image based on a fourth ratio range value; randomly scaling a width and a height of the original fundus image based on a fifth ratio range value; and randomly rotating the original fundus image based on a sixth ratio range value.

S14. Replace an original softmax classification layer in InceptionV3 trained based on ImageNet with a softmax classification layer with the same number of categories of the object, and build an initial neural network model, the initial neural network model being a single neural network model. As an optional solution, the softmax classification layer with the same number of categories of the object is a five-category softmax, and the original softmax in the InceptionV3 trained on ImageNet is replaced with the five-category softmax to build an initial neural network model. In one embodiment, according to the description of the foregoing embodiment of the present disclosure, it may be learned that InceptionV3 may be replaced by other neural network models based on image data sets.

S15. Train the neural network model based on the category of the included object and a training set constructed by the adjusted original fundus image and the new fundus image. As an optional solution, different batches of training sets are constructed by the adjusted original fundus image and new fundus image, an initial neural network model is input for training, and a plurality of iterations are performed until the loss function of the neural network model satisfies the convergence condition to obtain a trained neural network model.

S16. Input a to-be-predicted fundus image into the trained neural network model, and determine a category of the to-be-predicted image. As an optional solution, a result of determining the category of the to-be-predicted image includes normal, mild non-proliferative, moderate non-proliferative, severe non-proliferative, or proliferative.

Figure 8:
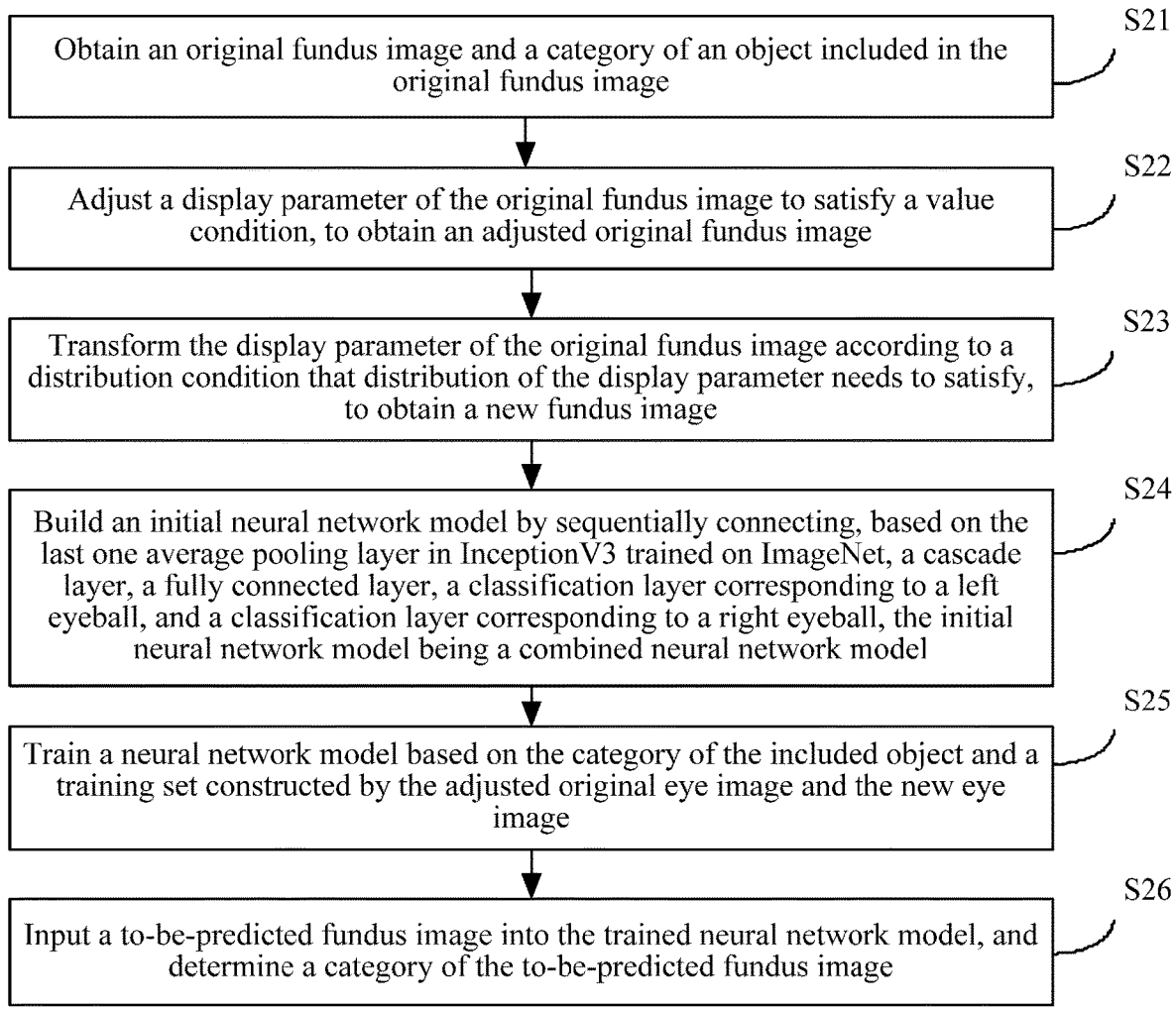
FIG. 8 is a flowchart of an image classification method according to another specific embodiment of the present disclosure.

Reference is made to FIG. 8, in which an original image is a fundus image and a combined neural network model is trained based on InceptionV3 trained on ImageNet. The image classification method provided in the embodiment of the present disclosure is described as follows.

S21. Obtain an original fundus image and a category of an object included in the original fundus image. As an optional solution, the category of the object includes five categories that may assist in recognizing features of retinopathy of an eyeball, respectively normal, mild non-proliferative, moderate non-proliferative, severe non-proliferative, or proliferative.

S22. Adjust a display parameter of the original fundus image to satisfy a value condition, to obtain an adjusted original fundus image. As an optional solution, the adjusting a display parameter of the original fundus image to satisfy a value condition includes: scaling the original fundus image so that an eyeball in the original fundus image has the same radius, such as 300 pixels; subtracting a preset pixel value within a preset pixel region range from each channel of each pixel in the original fundus image, multiplying each pixel value by a preset fixed value, and then adding each pixel value to a grayscale value at a preset ratio; cropping a non-imaging no-information region of the original fundus image; and scaling the original fundus image to a preset size, such as 299 pixels wide and 299 pixels high.

S23. Transform the display parameter of the original fundus image according to a distribution condition that distribution of the display parameter needs to satisfy, to obtain a new fundus image. As an optional solution, the method of transforming the display parameter of the original fundus image according to a distribution condition that distribution of the display parameter needs to satisfy includes at least one of the following: horizontally flipping the original fundus image or the new fundus image with a preset probability value; randomly cropping a width and a height of the original fundus image based on a first ratio range value; randomly performing addition/subtraction operation on brightness of the original fundus image based on a second ratio range value; randomly performing multiplication/division operation on brightness of the original fundus image based on a third ratio range value; randomly performing multiplication/division operation on contrast of the original fundus image based on a fourth ratio range value; randomly scaling a width and a height of the original fundus image based on a fifth ratio range value; and randomly rotating the original fundus image based on a sixth ratio range value.

Figure 9:
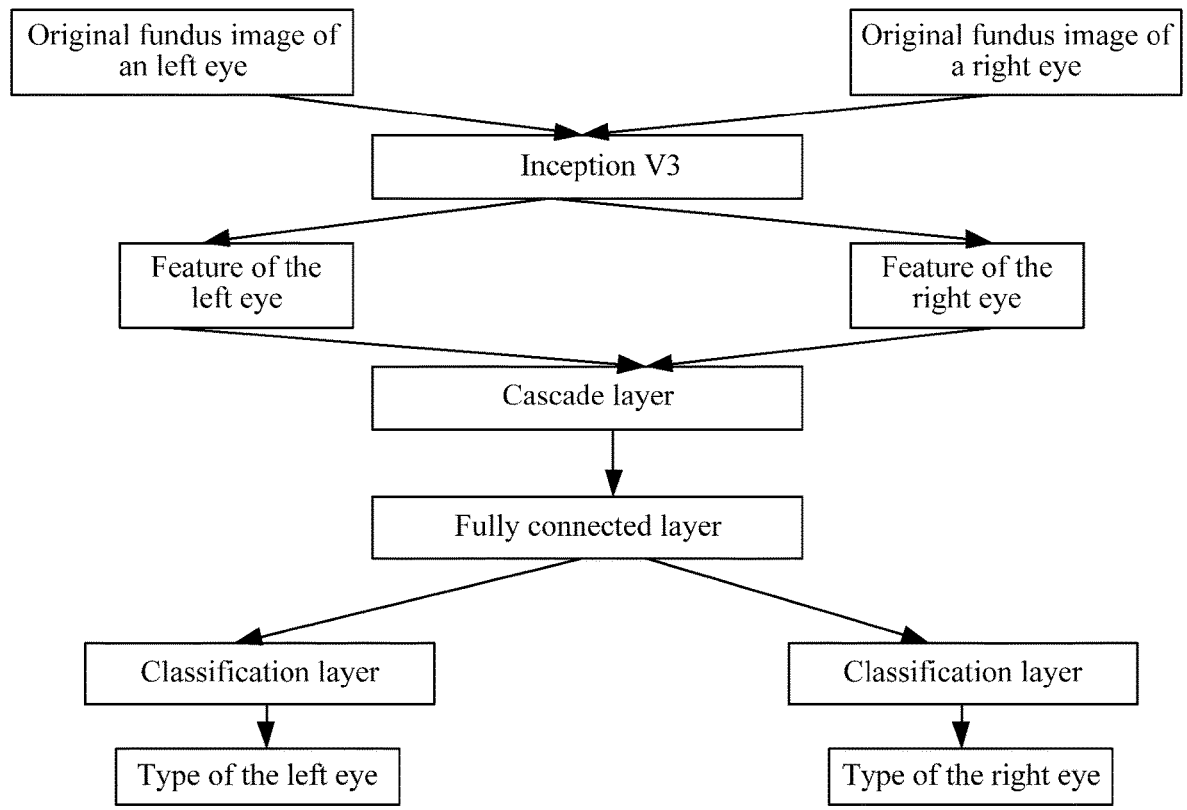
FIG. 9 is a schematic structural diagram of a neural network model according to the embodiment shown in FIG. 8.

S24. Build an initial neural network model by sequentially connecting, based on the last one average pooling layer in InceptionV3 trained on ImageNet, a cascade layer, a fully connected layer, a classification layer corresponding to a left eyeball, and a classification layer corresponding to a right eyeball. As shown in FIG. 9, the initial neural network model is a combined neural network model. According to the description of the foregoing embodiment of the present disclosure, it may be learned that InceptionV3 may be replaced by other neural network models based on image data sets.

S25. Train the neural network model based on the category of the included object and a training set constructed by the adjusted original fundus image and the new fundus image. As an optional solution, different batches of training sets are constructed by the adjusted original fundus image and new fundus image, an initial neural network model is input for training, and a plurality of iterations are performed until the loss function of the neural network model satisfies the convergence condition to obtain a trained neural network model.

S26. Input a to-be-predicted fundus image into the trained neural network model, and determine a category of the to-be-predicted image. As an optional solution, the combined neural network model uses the same InceptionV3 to receive a fundus image of the left eye and a fundus image of the right eye as inputs, and generates two same feature vectors with same dimensions such as 2048 dimensions through the average pooling layer of InceptionV3. The two feature vectors of the same dimensions are cascaded through the cascade layer to form a feature vector, such as a feature vector with 4096 dimensions. Down-sampling is performed through the fully connected layer to obtain a feature vector after dimension reduction, such as a 512-dimensional distance vector. The feature vector after dimension reduction is respectively inputted into a classification layer corresponding to the left eyeball and a classification layer corresponding to the right eyeball, so as to obtain corresponding classification results. A result of determining the category of the to-be-predicted image includes normal, mild non-proliferative, moderate non-proliferative, severe non-proliferative, or proliferative.

In the foregoing image classification methods, the example where the original image is a fundus image is used for description. As eyes are one of the most important organs of the human body, a person obtains information from the outside world mainly realized through the eyes. An eye disease may affect eyesight, or even may cause blindness and disability. Loss of vision is bound to greatly reduce living quality of a patient. Occult eye diseases such as glaucoma and diabetic retinopathy have no eyesight changes in the early stage, and fundus photography is an effective method for early detection of occult eye diseases. Fundus photography is a fundus examination that has been used more frequently in recent years, which is to use a special instrument such as a digital camera to connect to a fundus mirror to display the fundus image on a computer device. The fundus image may be printed and saved in the medical record, and may further be used for comparison before and after treatment. The fundus image can objectively record the retinal morphological changes in the posterior pole of the fundus, and has good objectivity, repeatability, and comparability. At present, the fundus image is used for fundus screening, the fundus image is graded through interpretation by an ophthalmologist at an interpretation center, so that the patient may get early treatment, and the progress of the disease may be delayed, to implement a transition from disease treatment to disease prevention. However, a fundus screening project using the fundus photography technology usually generates a large number of fundus photos that need to be graded, most of the fundus photos being a normal retina. This situation will cause most of the grading time of ophthalmologists to be spent on normal fundus photos without any eye disease symptom. Not only accuracy of classification depends on the personal level of the ophthalmologist for interpretation, but also the classification efficiency is very low. According to the image classification method provided in the embodiment of the present disclosure, the fundus image may be classified effectively, with high accuracy, automatically. The method is simple to use and has a fast determining speed. Even if there is no professional recognition ability for a fundus photo, an accurate determining result may be obtained quickly, thereby improving the efficiency of classification of fundus photos and greatly reducing workload of a professional. Therefore, the determining result does not depend on the individual professional level, and the classification accuracy is high and stable.

In one embodiment, in the embodiment shown in FIG. 7 or FIG. 8, the original image may further be other images including to-be-classified objects, which may be configured to construct, during prediction of the category of the object through the neural network model, any other application scenario in which there are few original images in the training set, and may be is small. For example, the to-be-classified object is an eye, and the category of the object may include five categories of different shapes of the eye: phoenix eyes, triangular eyes, willow eyes, fox eyes, and almond eyes. The corresponding original image is an eye image. Based on the same technical concept as the embodiment shown in FIG. 7 or FIG. 8, a single neural network model or a combined neural network model may be constructed as the initial neural network model, the display parameter is adjusted using the eye image as the original image to obtain the adjusted original image, and the display parameter is transformed to obtain a new image. Through the training set constructed based on the adjusted original image and the new image, the initial neural network model is trained to obtain a trained neural network model. During prediction, the to-be-predicted eye image including the eyes is inputted into the trained neural network model, and the results of determining the category are correspondingly phoenix eyes, triangular eyes, willow eyes, fox eyes, and almond eyes. The recognition of the eye shape in the eye image in one embodiment may be an example of the case that the dimension used for classifying the object included in the image may be an external characteristic presented by the appearance of the object.

For another example, to-be-classified objects are human hands, and the categories of the objects may include four categories of different shapes of the hands: square hands, oval hands, conical hands, and pointed hands. The corresponding original image is an eye image. Based on the same technical concept as the embodiment shown in FIG. 7 or FIG. 8, a single neural network model or a combined neural network model may be constructed as the initial neural network model, the display parameter is adjusted using the hand image as the original image to obtain the adjusted original image, and the display parameter is transformed to obtain a new image. Through the training set constructed based on the adjusted original image and the new image, the initial neural network model is trained to obtain a trained neural network model. During prediction, the to-be-predicted hand image including the hands is inputted into the trained neural network model, and the results of determining the category may be correspondingly square hands, oval hands, conical hands, and pointed hands. In one embodiment, recognition of the hand shape in the hand image is another example of the case that the dimension used for classifying the object included in the image may be an external characteristic presented by the appearance of the object. The determining of the hand shape may also be mapped to determining of intrinsic characteristics such as the personal personality or habits. For example, a person with square hands is generally considered to have a rational character, strong work ability, and a leadership-like hand shape. A person with conical hands are often considered emotional, talented, tactical, and the like.

In an embodiment, under the technical concept disclosed in the embodiments of the present disclosure, the original image may further be other images that include other objects, that need to classify the objects, and that include a very small number of images in the category. The original image is adjusted, the display parameter of the original image is transformed according to the distribution condition that distribution of the display parameter of the original image needs to satisfy, to obtain a new image. A training set for training the neural network model is constructed by the original image and the new image. In a case that there are relatively few training samples, the original image and the new image are used to form more training sets to train the neural network model, so as to obtain sufficient classification dimensions and ensure classification accuracy. Therefore, the image classification method provided in the embodiment of the present disclosure may be suitable for classifying a wider range of objects, which has stronger practicability.

Figure 10:
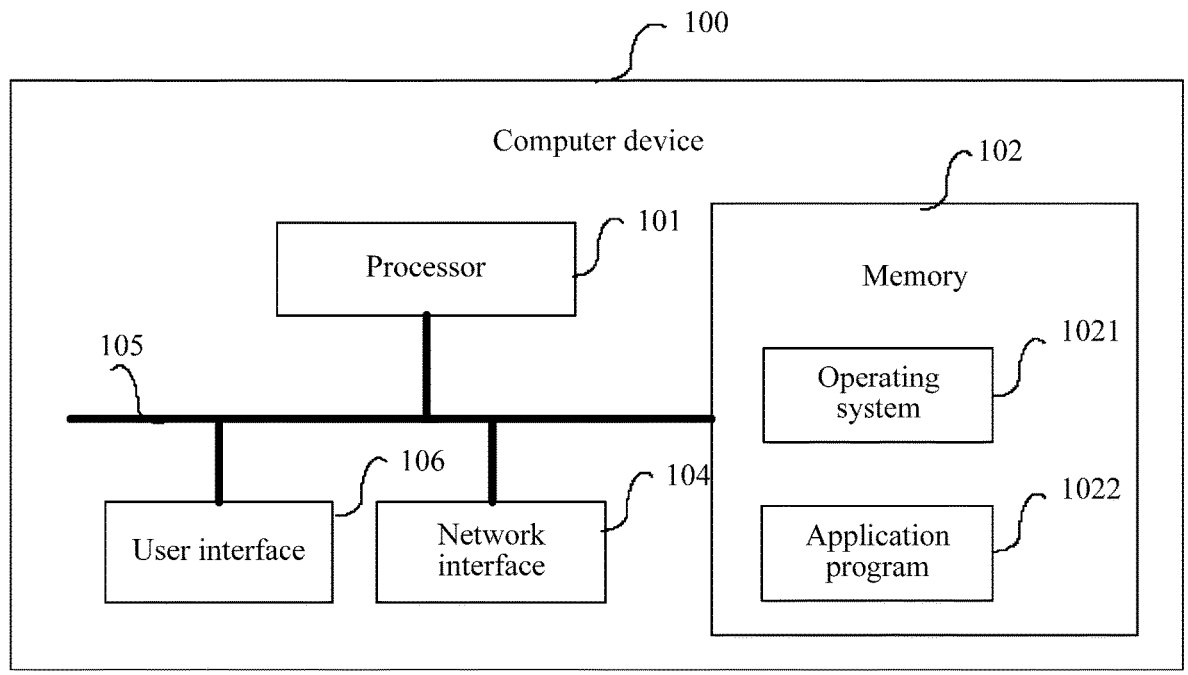
FIG. 10 is a schematic structural diagram of hardware of a computer device according to an embodiment of the present disclosure.

The image classification method provided in the embodiment of the present disclosure may be implemented on a terminal side or a server side. As for a hardware structure of the computer device, reference is made to FIG. 10. FIG. 10 is a schematic structural diagram of optional hardware of a computer device 100 according to an embodiment of the present disclosure. The computer device 100 may be a mobile phone, a computer device, a tablet device, a personal digital assistant, a medical device, and the like. As shown in FIG. 10, the computer device 100 includes: at least one processor 101, a memory 102, at least one network interface 104, and a user interface 106. Various assemblies in the computer device are coupled together via a bus system 105. In an embodiment, the bus system 105 is configured to implement connection and communication between these assemblies. In addition to a data bus, the bus system 105 further includes a power bus, a control bus, and a status signal bus. However, for the sake of clarity, various buses are marked as a bus system in FIG. 10.

The user interface 106 may include a display, a keyboard, a mouse, a trackball, a click wheel, a key, a button, a touchpad, or a touch screen.

In an embodiment, the memory 102 may be a volatile memory or a non-volatile memory, or may include both a volatile memory and a non-volatile memory. The non-volatile memory may be a read-only memory (ROM), or a programmable read-only memory (PROM), which may be used as an external cache. According to exemplary but not limited descriptions, many forms of RAMs are available, for example, a static random access memory (SRAM), a synchronous static random access memory (SSRAM), and the like. The memory according to the embodiment of the present disclosure is intended to include, but not limited to, these and any other suitable types of memories.

The memory 102 in the embodiment of the present disclosure is configured to store various types of data to support operation of the computer device 100. Examples of the data include: any executable program operating on the computer device 100, for example, an operating system 1021 and an application program 1022; an original image; and a new image obtained by transforming the original image. The operating system 1021 includes various system programs, for example, a framework layer, a core library layer, a driver layer, and the like, which are used for implementing various basic services and processing a task based on hardware. The application program 1022 may include various application programs such as a media player, a browser, and the like, used for implementing various application services. The image classification method provided in the embodiment of the present disclosure may be included in the application program 1022.

The method disclosed in the embodiment of the present disclosure may be applied to the processor 101 or implemented by the processor 101. The processor 101 may be an integrated circuit chip and has a signal processing capability. During implementation, each step of the foregoing method may be completed through an integrated logic circuit of hardware in the processor 101 or an instruction in the form of software. The foregoing processor 101 may be a general-purpose processor, a digital signal processor (DSP), or other programmable logic devices, a discrete gate or a transistor logic device, a discrete hardware component, and the like. The processor 101 may implement or execute various methods, steps, and logic block diagrams disclosed in the embodiments of the present disclosure. The general-purpose processor 101 may be a microprocessor, any conventional processor, or the like. In combination with the image classification method provided in the embodiment of the present disclosure, the steps may be directly implemented by a hardware decoding processor, or may be performed by a combination of hardware and software modules in the decoding processor. The software module may be located in a storage medium, the storage medium being located in the memory. The processor reads the information in the memory and completes the steps of the foregoing method in combination with hardware thereof.

In an exemplary embodiment, the computer device 100 may be implemented by one or more application specific integrated circuits (ASIC), a DSP, a programmable logic device (PLD), and a complex programmable logic device (CPLD) to perform the foregoing method.

Figure 11:
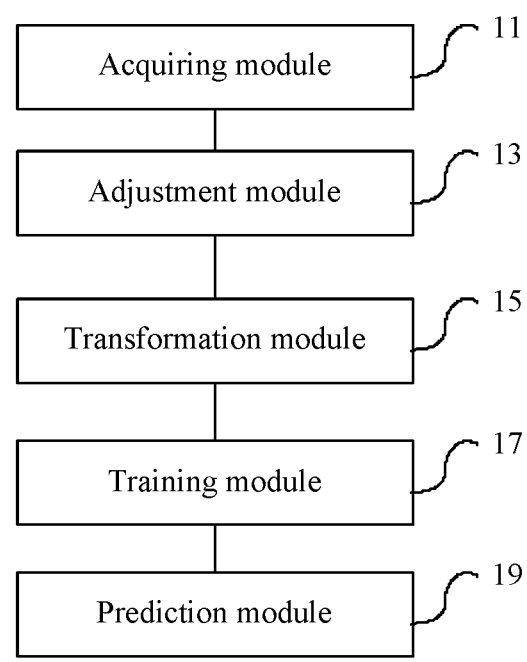
FIG. 11 is a schematic structural diagram of a computer device according to another embodiment of the present disclosure.

In an exemplary embodiment, FIG. 11 is a schematic structural diagram of a computer device according to an embodiment of the present disclosure. The computer device includes: an acquiring module 11 configured to obtain an original image and a category of an object included in the original image; an adjusting module 13 configured to adjust a display parameter of the original image to satisfy a value condition; a transformation module 15 configured to transform the display parameter of the original image according to a distribution condition that distribution of the display parameter needs to satisfy, to obtain a new image; a training module 17 configured to train a neural network model based on the category of the included object and a training set constructed by the adjusted original image and the new image; and a prediction module 19 configured to determine a category of an object included in a to-be-predicted image based on the trained neural network model.

In one embodiment, the training module 17 includes an initialization unit and a single model training unit. The initialization unit is configured to initialize a neural network model. The single model training unit is configured to input images included in the training set and corresponding categories into the neural network model for iterative training until a loss function of the neural network model satisfies a convergence condition, to obtain a single neural network model for classifying the to-be-predicted image.

The device further includes a loss function determining module configured to obtain a loss function of the neural network model by combining a K loss function and a multi-categorization logarithmic loss function at a preset ratio.

In another embodiment, the training module 17 includes an initialization unit, a combined unit, and a combined model training unit. The initialization unit is configured to initialize a neural network model. The combined unit is configured to initialize, according to at least two objects included in the original image, a cascade layer, a fully connected layer, a classification layer corresponding to the object that are sequentially connected to the neural network model, to obtain a combined neural network model used for classifying the to-be-predicted image. The combined model training unit is configured to input an image included in the training set and a corresponding category into the combined neural network model for iterative training until the loss function satisfies the convergence condition.

In an embodiment, the prediction module 19 is specifically configured to: in a single neural network model, extract an image feature in the to-be-predicted image, and perform down-sampling processing on the extracted image feature; and map a feature of the down-sampling process to a probability that the object belongs to different categories.

In another embodiment, the prediction module 19 is specifically configured to: in a combined neural network model, correspondingly extract an image feature from a to-be-predicted image of at least two objects using the combined neural network model; cascade the extracted image feature and perform down-sampling processing; and respectively map an image feature of the down-sampling process to a probability that the at least two objects belong to different categories.

In one embodiment, the adjustment module 13 includes a detection unit and an adjustment unit. The detection unit is configured to detect an imaging region of an object included in the original image. The adjustment unit is configured to adjust dimensions of the original image to be consistent with dimensions of the imaging region of the object included in the original image.

In another embodiment, the adjustment module 13 includes an enhancement unit configured to perform image enhancement processing on each color channel of the original image based on a recognition degree that the original image needs to satisfy.

In another embodiment, the adjustment module 13 includes a cropping unit and a dimension unit. The cropping unit is configured to crop a non-imaging region of an object in the original image. The dimension unit is configured to adjust a cropped image to preset dimensions.

The adjustment module 13 may include a detection unit, an adjustment unit, an enhancement unit, a cropping unit, and a dimension unit simultaneously. The detection unit is configured to detect an imaging region of an object included in the original image. The adjustment unit is configured to adjust dimensions of the original image to be consistent with dimensions of the imaging region of the object included in the original image. The enhancement unit is configured to perform image enhancement processing on each color channel of the original image based on a recognition degree that the original image needs to satisfy. The cropping unit is configured to crop a non-imaging region of the object in the original image. The dimension unit is configured to adjust a cropped image to preset dimensions.

In one embodiment, the transformation module 15 includes a determining unit and a transformation unit. The determining unit is configured to determine, according to a value space in which a display parameter of at least one category of the image is located and a distribution condition that the value space satisfies, a missing display parameter according to the display parameter of the original image compared with the distribution condition. The transformation unit is configured to transform the display parameter of the original image into the missing display parameter, to obtain a new image.

When the computer device provided in the foregoing embodiment performs image classification, only division of the foregoing program modules is used as an example for sake of description. In actual application, the foregoing processing allocation may be completed by different program modules as required, that is, an internal structure of the device is divided into different program modules to complete all or part of the processing described above. In addition, the computer device and the image classification method provided in the foregoing embodiments are based on the same concept. Therefore, for a detailed implementation process, reference is made to the method embodiments, and the details are not described herein again.

In an exemplary embodiment, an embodiment of the present disclosure further provides a readable storage medium, such as a memory including an executable program, and the foregoing executable program may be executed by a processor to complete the steps of the foregoing method. The readable storage medium may be a memory such as an FRAM, a ROM, a PROM, an EPROM, an EEPROM, a flash memory, a magnetic surface memory, an optical disk, or a CD-ROM, or may be various devices including one or any combination of the foregoing memories, for example, a mobile phone, a computer device, a tablet device, a personal digital assistant, a medical device, and the like.

An embodiment of the present disclosure further provides a computer device, the computer device including: a processor configured to store a computer program that can be run on the processor, the processor being configured to perform the following method when running the computer program. An image classification method includes: obtaining an original image and a category of an object included in the original image; adjusting a display parameter of the original image to satisfy a value condition; transforming the display parameter of the original image according to a distribution condition that distribution of the display parameter needs to satisfy, to obtain a new image; training a neural network model based on the category of the included object and a training set constructed by the adjusted original image and the new image; and determining a category of an object included in a to-be-predicted image based on the trained neural network model.

The processor is further configured to perform the operations when running the computer program. the training a neural network model includes: initializing the neural network model; and inputting an image included in the training set and a corresponding category into the neural network model for iterative training until a loss function of the neural network model satisfies a convergence condition, to obtain a single neural network model for classifying the to-be-predicted image.

The processor is further configured to perform the operations when running the computer program: obtaining the loss function of the neural network model by combining a K loss function and a multi-categorization logarithmic loss function at a preset ratio.

The processor is further configured to perform the operations when running the computer program. The training a neural network model includes: initializing the neural network model; initializing, according to at least two objects included in the original image, a cascade layer, a fully connected layer, a classification layer corresponding to the object that are sequentially connected to the neural network model, to obtain a combined neural network model used for classifying the to-be-predicted image; and inputting an image included in the training set and a corresponding category into the combined neural network model for iterative training until the loss function satisfies the convergence condition.

The processor is further configured to perform the operations when running the computer program. The determining a category of an object included in a to-be-predicted image based on the trained neural network model includes: in a single neural network model, extracting an image feature in the to-be-predicted image, and performing down-sampling processing on the extracted image feature; mapping a feature of the down-sampling process to a probability that the object belongs to different categories.

The processor is further configured to perform the operations when running the computer program. The determining a category of an object included in a to-be-predicted image based on the trained neural network model includes: in a combined neural network model, correspondingly extracting an image feature from a to-be-predicted image of at least two objects using the combined neural network model; cascading the extracted image feature and performing down-sampling processing; and respectively mapping an image feature of the down-sampling process to a probability that the at least two objects belong to different categories.

The processor is further configured to perform the operations when running the computer program. The adjusting a display parameter of the original image to satisfy a value condition includes: detecting an imaging region of an object included in the original image; and adjusting dimensions of the original image to be consistent with dimensions of the imaging region of the object included in the original image.

The processor is further configured to perform the operations when running the computer program. The adjusting a display parameter of the original image to satisfy a value condition includes: performing image enhancement processing on each color channel of the original image based on a recognition degree that the original image needs to satisfy.

The processor is further configured to perform the operations when running the computer program. The adjusting a display parameter of the original image to satisfy a value condition includes: cropping a non-imaging region of the object in the original image; and adjusting the cropped image to preset dimensions.

The processor is further configured to perform the operations when running the computer program. The transforming the display parameter of the original image according to a distribution condition that distribution of the display parameter needs to satisfy, to obtain a new image includes: determining, according to a value space in which the display parameter of at least one category of the image is located and a distribution condition that the value space satisfies, a missing display parameter according to the display parameter of the original image compared with the distribution condition; and transforming the display parameter of the original image into the missing display parameter, to obtain a new image.

As another optional embodiment, the computer device may be a server shown in FIG. 1 and includes a processor, an internal memory, a network interface, and a non-volatile storage medium connected through a system bus. The processor is configured to implement a computing function and a function of controlling a server to work, and the processor is configured to perform the image classification method provided in the embodiments of the present disclosure. The non-volatile storage medium stores an operating system, a database, and a computer device for implementing the image classification method provided in the embodiment of the present disclosure. The network interface is configured to connect to a terminal.

The descriptions are only specific implementations of the present disclosure, but are not intended to limit the protection scope of the present disclosure. Any variation or replacement readily figured out by persons skilled in the art within the technical scope disclosed in the present disclosure shall fall within the protection scope of the present disclosure. Therefore, the protection scope of the present disclosure shall be subject to the protection scope of the claims.

What is claimed is:

1. An image classification method for a computer device, comprising:
   obtaining a plurality of original images, each original image containing at least two objects, the at least two objects being objects that are same or symmetrical;
   for each original image,
      obtaining a category of each object contained in the original image;
      adjusting a display parameter of the original image to satisfy a value condition to obtain an adjusted original image for the each object;
      generating, for the each object, a transformed image from the original image by transforming a second display parameter of the original image according to a preset distribution condition that distribution of the display parameter needs to satisfy;
   training a neural network model based on the categories of the objects in the original images and a training set constructed by the adjusted original images and the transformed images of the at least two objects, comprising:
      inputting the training set into an initial neural network model for training;
      respectively obtaining image features of the at least two objects output from a last average pooling layer of the initial neural network model;
      concatenating the image features of the at least two objects at a cascade layer of a combined neural network model;
      mapping the concatenated image features to a sample label space at a fully-connected layer of the combined neural network model, to obtain model weights;
      connecting at least two classification layers of the combined neural network model to the fully-connected layer, each classification layer corresponding to one of the at least two objects and outputting probabilities of the corresponding object belonging to different categories;
      iteratively training the combined neural network model until a loss function satisfies a convergence condition, to obtain the trained neural network model; and
   determining a category of an object contained in a to-be-predicted image based on the trained neural network model.

2. The image classification method according to claim 1, further comprising:
   obtaining the loss function of the neural network model by combining a K loss function and a multi-categorization logarithmic loss function at a preset ratio.

3. The image classification method according to claim 1, wherein the determining a category of an object contained in a to-be-predicted image based on the trained neural network model comprises:
   correspondingly extracting image features of at least two objects included in the to-be-predicted image using the combined neural network model;
   concatenating the extracted image features of the at least two objects and performing down-sampling processing; and respectively mapping the image features from the down-sampling process to a probability that each of the at least two objects belong to different categories.

4. The image classification method according to claim 1, wherein the adjusting a display parameter of the original image to satisfy a value condition comprises:
   detecting an imaging region of the object contained in the original image; and
   adjusting dimensions of the original image to be consistent with dimensions of the imaging region of the object contained in the original image.

5. The image classification method according to claim 1, wherein the adjusting a display parameter of the original image to satisfy a value condition comprises:
   performing image enhancement processing on each color channel of the original image based on a recognition degree that the original image needs to satisfy.

6. The image classification method according to claim 1, wherein the adjusting a display parameter of the original image to satisfy a value condition comprises:
   cropping a non-imaging region of the object in the original image; and
   adjusting the cropped image to preset dimensions.

7. The image classification method according to claim 1, wherein the transforming the display parameter of the original image according to a distribution condition that distribution of the display parameter needs to satisfy, to obtain a transformed image comprises:
   determining, according to a value space in which a display parameter of at least one category of the original image is located and a distribution condition that the value space satisfies, a missing display parameter according to the display parameter of the original image compared with the distribution condition; and
   transforming the display parameter of the original image into the missing display parameter, to obtain the transformed image.

8. A computer device, comprising:
   a memory storing computer-readable instructions; and
   a processor coupled to the memory for executing the computer-readable instructions to perform:
   obtaining a plurality of original images, each original image containing at least two objects, the at least two objects being objects that are same or symmetrical;
   for each original image,
      obtaining a category of each object contained in the original image;
      adjusting a display parameter of the original image to satisfy a value condition to obtain an adjusted original image for the each object;
      generating, for the each object, a transformed image from the original image by transforming a second display parameter of the original image according to a preset distribution condition that distribution of the display parameter needs to satisfy;
   training a neural network model based on the categories of the objects in the original images and a training set constructed by the adjusted original images and the transformed images of the at least two objects, comprising:
      inputting the training set into an initial neural network model for training;
      respectively obtaining image features of the at least two objects output from a last average pooling layer of the initial neural network model;
      concatenating the image features of the at least two objects at a cascade layer of a combined neural network model;
      mapping the concatenated image features to a sample label space at a fully-connected layer of the combined neural network model, to obtain model weights;
      connecting at least two classification layers of the combined neural network model to the fully-connected layer, each classification layer corresponding to one of the at least two objects and outputting probabilities of the corresponding object belonging to different categories;
      iteratively training the combined neural network model until a loss function satisfies a convergence condition, to obtain the trained neural network model; and
   determining a category of an object contained in a to-be-predicted image based on the trained neural network model.

9. The computer device according to claim 8, wherein the processor further performs:
   obtaining the loss function of the neural network model by combining a K loss function and a multi-categorization logarithmic loss function at a preset ratio.

10. The computer device according to claim 8, wherein the determining a category of an object contained in a to-be-predicted image based on the trained neural network model comprises:
    in the combined neural network model, correspondingly extracting image features of at least two objects included in the to-be-predicted image;
    concatenating the extracted image features of the at least two objects and performing down-sampling processing on the extracted image feature; and
    respectively mapping the image features from the down-sampling process to a probability that each of the at least two objects belong to different categories.

11. A non-transitory computer-readable storage medium storing computer-readable instructions executable by at least one processor to perform:
    obtaining a plurality of original images, each original image containing at least two objects, the at least two objects being objects that are same or symmetrical;
    for each original image,
       obtaining a category of each object contained in the original image;
       adjusting a display parameter of the original image to satisfy a value condition to obtain an adjusted original image for the each object;
       generating, for the each object, a transformed image from the original image by transforming a second display parameter of the original image according to a preset distribution condition that distribution of the display parameter needs to satisfy;
    training a neural network model based on the categories of the objects in the original images and a training set constructed by the adjusted original images and the transformed images of the at least two objects, comprising:
       inputting the training set into an initial neural network model for training;
       respectively obtaining image features of the at least two objects output from a last average pooling layer of the initial neural network model;
       concatenating the image features of the at least two objects at a cascade layer of a combined neural network model;

mapping the concatenated image features to a sample label space at a fully-connected layer of the combined neural network model, to obtain model weights;

connecting at least two classification layers of the combined neural network model to the fully-connected layer, each classification layer corresponding to one of the at least two objects and outputting probabilities of the corresponding object belonging to different categories;

iteratively training the combined neural network model until a loss function satisfies a convergence condition, to obtain the trained neural network model; and determining a category of an object contained in a to-be-predicted image based on the trained neural network model.

12. The non-transitory computer-readable storage medium according to claim 11, wherein the computer-readable instructions are executable by the at least one processor to perform:

obtaining the loss function of the neural network model by combining a K loss function and a multi-categorization logarithmic loss function at a preset ratio.

13. The non-transitory computer-readable storage medium according to claim 11, wherein the determining a category of an object contained in a to-be-predicted image based on the trained neural network model comprises:

in the combined neural network model, correspondingly extracting image features of at least two objects included in the to-be-predicted image;

concatenating the extracted image features of the at least two objects and performing down-sampling processing on the extracted image feature; and respectively mapping the image features from the down-sampling process to a probability that each of the at least two objects belong to different categories.

14. The method according to claim 1, wherein the preset distribution condition comprises: a preset value range that limits a value of a transformed display parameter of the transformed image and a statistical distribution type that the transformed display parameter needs to satisfy with respect to the second display parameter of the original image, each transformed image containing one of the at least two objects.

15. The method according to claim 14, wherein the statistical distribution type is one of average distribution, random distribution, and Gaussian distribution; and the second display parameter includes at least one of a direction, dimensions, brightness, contrast, an aspect ratio, resolution, or a color.

* * * * *